H. FELTMAN.
CULTIVATOR COUPLINGS.
No. 184,960.                   Patented Dec. 5, 1876.
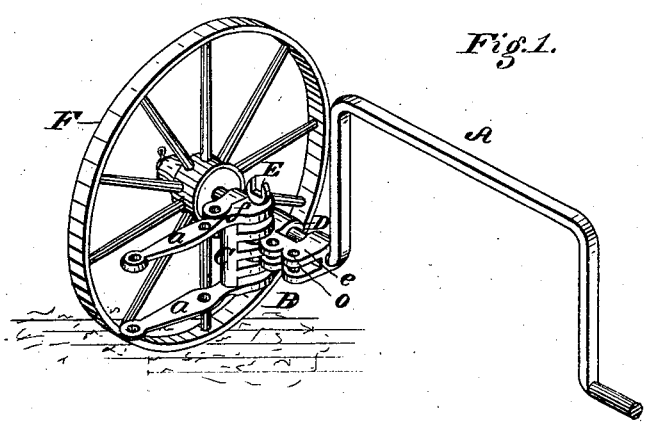
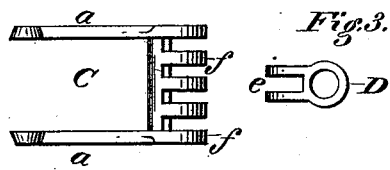
Witnesses:
Donn I. Twitchell.
Frank R. Gurley.
Inventor:
H. Feltman,
by Dodge & Son,
Attys.

UNITED STATES PATENT OFFICE.

HENRY FELTMAN, OF PEKIN, ILLINOIS.

IMPROVEMENT IN CULTIVATOR-COUPLINGS.

Specification forming part of Letters Patent No. 184,960, dated December 5, 1876; application filed October 6, 1876.

*To all whom it may concern:*

Be it known that I, HENRY FELTMAN, of Pekin, in the county of Tazewell and State of Illinois, have invented certain Improvements in Cultivator-Couplings, of which the following is a specification:

My invention consists in an improved coupling for attaching the beam to the axle in a wheel-cultivator, as hereinafter more fully explained.

In the drawing, Figure 1 is a perspective view of my improved device in position, and Figs. 2 and 3 views of separate parts of the same.

The object of my invention is to produce a coupling which will allow the beam to move both vertically and laterally, and which may be readily adjusted to regulate the height of the forward end of the beam, or the distance between the beams, as desired.

In constructing my improved coupling, I first provide a sleeve, D, having one or more projecting flanges, e, which, as shown in Fig. 1, are pierced at regular intervals with holes o. This sleeve D is passed on to the lower horizontal portion of the axle A from the end, said portion being left round to allow the sleeve to turn freely thereon, as shown in Fig. 1. The wheel F is then placed in position on the lower horizontal arm of the axle, thus keeping the sleeve D in place, said sleeve extending from the hub of the wheel to the upright or vertical portion of the axle with sufficient space at its ends to permit it to turn freely on the axle. When the sleeve is in position, the flanges e stand out in a horizontal position, or nearly so, in rear of the axle, as shown in Fig. 1, said leaves being provided, as before stated, with holes o, arranged at regular intervals between the ends of the leaves, and occupying a vertical position when the parts are in place. The clevis C, which is attached to the end of the beam, is of common form, having two arms, a, by which it is secured to the beam, and a series of ears, f, arranged one above another, as shown in Figs. 1 and 2, said ears being each provided with a hole passing through it from top to bottom, the holes being all arranged in line. As shown in the drawing, the spaces between the ears f are just large enough to readily admit the leaves e of the sleeve D, and the space between the leaves e is in like manner just sufficient to readily receive the ears f. When it is desired to attach the beam to the axle, the clevis is carried forward, and one of the ears f caused to enter between the leaves e, said leaves entering in the same manner into spaces between the ears f, the height of the forward end of the beam being regulated just in proportion as the ear f, which enters between the leaves e, is near the top or bottom of the clevis. The height of the beam being thus regulated, it is next necessary to fix the distance between the beams, there being, of course, a wheel, a beam, and a coupling at either end of the axle. The clevis and sleeve D being locked into each other in the manner above described, the clevis is moved along until the holes in the ears f come in line with one of the holes in the leaves e, when a pin or bolt, E, is passed down through the holes in the ears f and the hole in the leaves e, the hole in the leaves being selected near the upright portion of the axle or near the wheel, just as it is desired to have the beams nearer together or further apart.

It will be seen that the pin or bolt E, passing through the ears f and leaves e, makes a hinge or joint, which allows the beam to swing around laterally in either direction, while the sleeve D, turning freely on the axle A, permits the beam to move freely up or down. By simply removing the pin or bolt E and raising or lowering the clevis, moving the same to the one side or the other, and inserting the pin or bolt again, the beam may be quickly and accurately adjusted.

It is obvious that, instead of two leaves e, one may be used; but I prefer to use two, as the joint is thus made stronger and more rigid, while more than two are considered unnecessary.

The construction may be somewhat modified without departing from the nature of my invention—as, for instance, the clevis may be made with but one or two ears f, and the sleeve D be made with a series of leaves, e, instead; but the form shown is considered the best. The whole forms a very simple and efficient device, and, being made of cast or malleable iron, is very cheap.

When the clevis is to be fastened or secured to an iron beam, it will be formed with a web extending between the arms $a$ and the iron beams secured to the sides by means of bolts passing through them in the usual manner.

Having thus described my invention, what I claim is—

The herein-described coupling for cultivators, consisting of the sleeve D, having one or more leaves or flanges, $e$, provided with a series of holes, in combination with the clevis $c$, provided with the series of perforated ears $f$, substantially as shown and described.

HENRY FELTMAN.

Witnesses:
 HENRY LAUTZ,
 CHRIST HEFFET.